Dec. 29, 1959   L. A. HAUTAU ET AL   2,919,010
LOADING AND UNLOADING MECHANISM FOR PRODUCTION MACHINES
Filed May 16, 1955   2 Sheets-Sheet 1
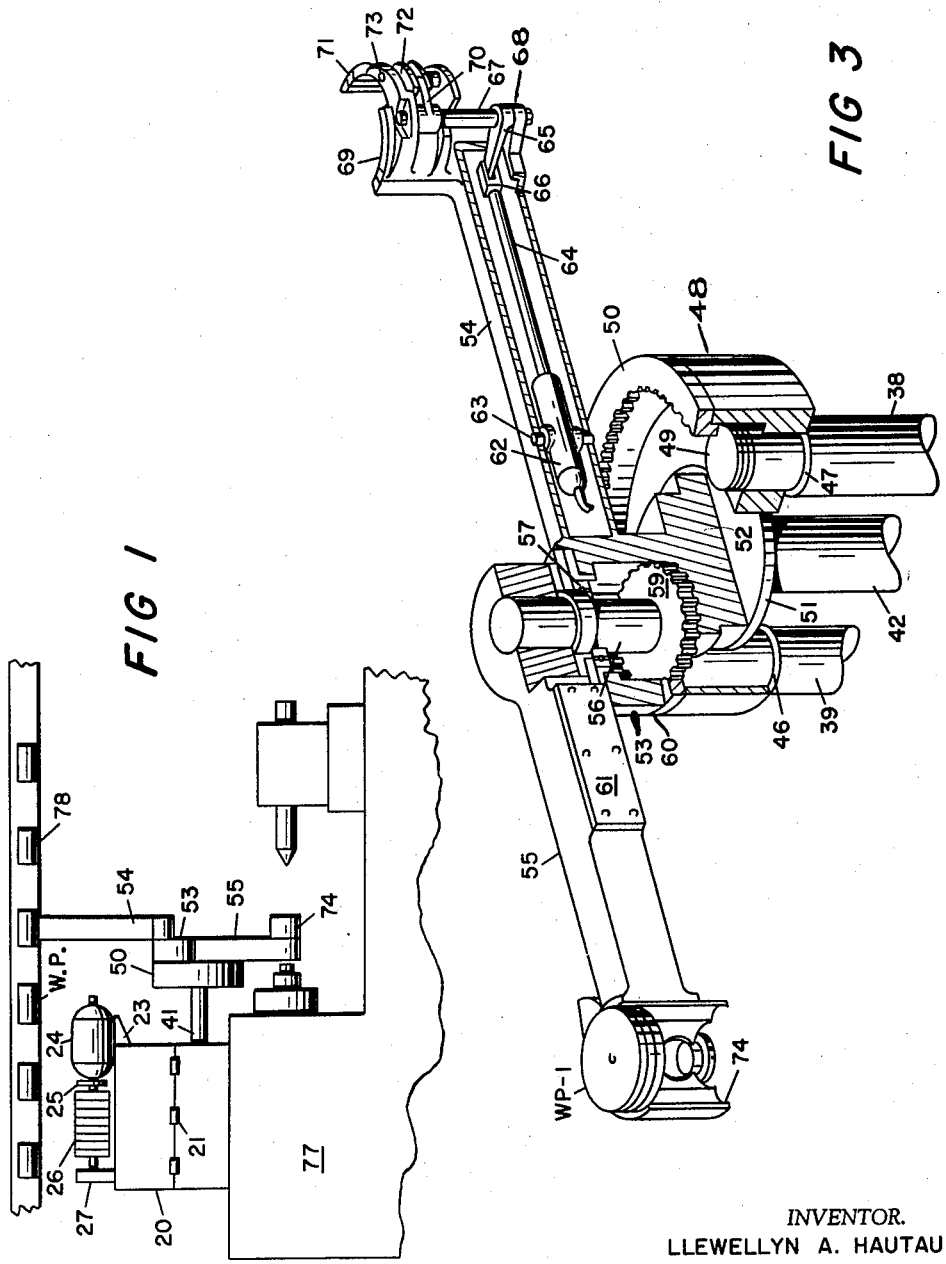
INVENTOR.
LLEWELLYN A. HAUTAU
BY CHARLES F. HAUTAU
ATTORNEY.

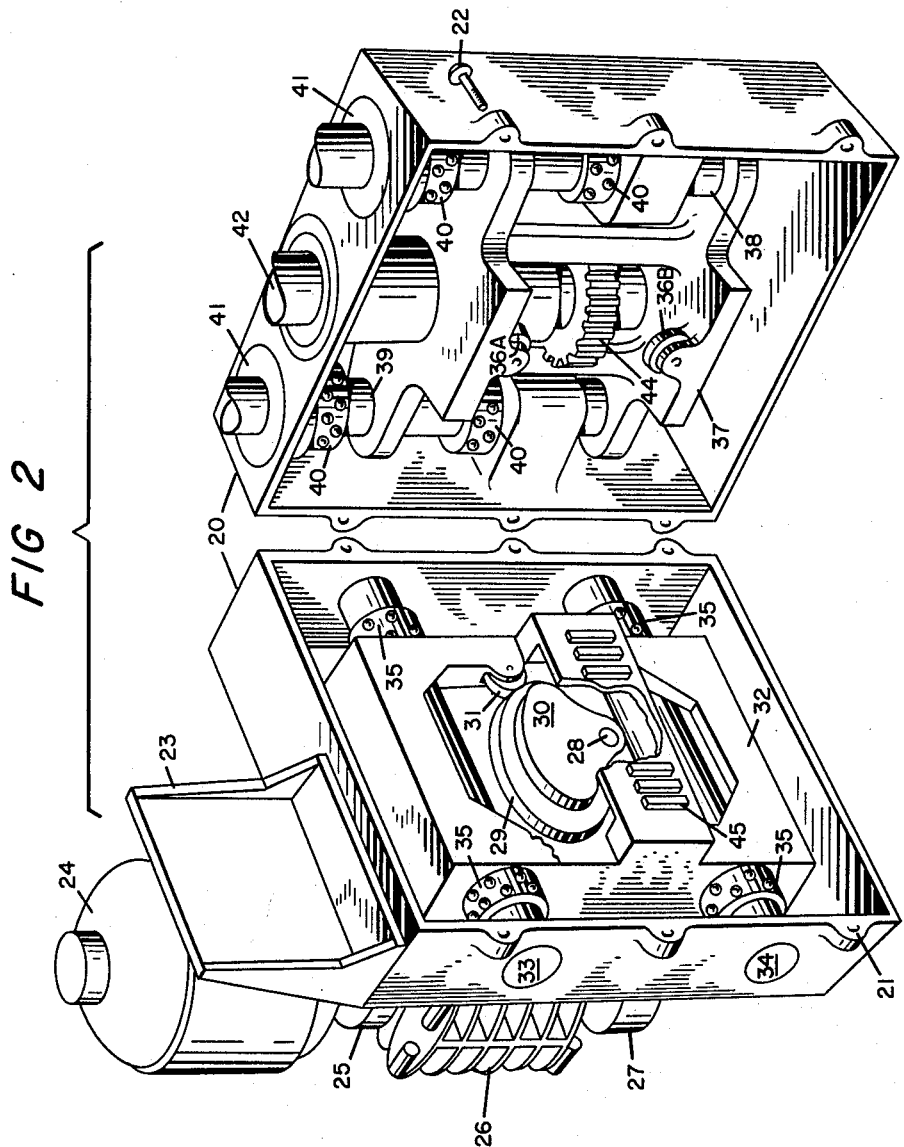

United States Patent Office 2,919,010
Patented Dec. 29, 1959

2,919,010

LOADING AND UNLOADING MECHANISM FOR PRODUCTION MACHINES

Llewellyn Alwin Hautau, Detroit, and Charles F. Hautau, Huntington Woods, Mich.

Application May 16, 1955, Serial No. 508,556

8 Claims. (Cl. 198—25)

This invention relates to apparatus for loading workpieces to and unloading workpieces from processing machines. It provides mechanism for picking an object up at first point and transferring the object to a second point while simultaneously removing another object from said second point and transferring it to the first point.

The invention finds particular use in the mass production industries and may form one link in what is termed an automation line.

An object of this invention is to provide a loader of the swinging load support type which has a novel pattern of arm motion, calculated to achieve an unusually quick feeding of the serviced machine.

A further object is to provide a swinging load support type loader in which the arm motion pattern is such as requires a minimum of clearance space.

A further object of the invention is to provide a loading and unloading apparatus which is primarily mechanically actuated so as to be fast, accurate and forceful in action.

Another object is to provide a novel and practical actuating mechanism for a loader which has a small physical size and which may be electrically controlled, so as to be utilized in a timed sequence with other production machinery.

The preferred embodiment of invention which is hereinafter described basically comprises a pair of work clamp carrying arms which pivot about a common center and a cam actuated mechanism which operates to pivot the arms about the center in the plane of the arms, reciprocate the center and move the center in a direction perpendicular to the plane of array of the arms.

The following detailed description of this preferred embodiment makes reference to the accompanying drawings in which:

Figure 1 is a view of the loader mounted on a lathe so as to service the lathe from a conveyor line;

Figure 2 is an exploded perspective view of the loader's actuating mechanism;

Figure 3 is a cutaway perspective view of the loader's hub mechanism and arms.

The loader's actuating mechanism is housed in a box 20 which may be opened for maintenance purposes so as to form two halves as is shown in Figure 2. Tabs 21, which extend outwardly from the halves, are joined by bolts 22 to assemble the box to the operating relationship shown in Figure 1.

As is shown in Figure 2 a bracket 23 which is fixed to the outer side of the box 20 serves to support an electric motor 24. The output shaft of the motor 24 attaches the driving member of an electrically actuated disk type clutch 25. The driven member of the clutch 25 is connected to one end of a double ended input shaft of a geared speed reducer 26. The other end of the input shaft of the speed reducer 26 connects to an electrically actuated brake 27. The output shaft 28 of the speed reducer 26 is set at right angles to the input shaft and it passes through a hole in the wall of the box 20 (not shown) and carries two cams 29 and 30 near its extremity within the box.

Two roller followers 31 (only one shown) ride on the cam 29. They are fixed in what will be termed the horizontal carrier frame 32. Actually the movement of the carrier 32 is only horizontal when viewed as in Figure 2 since the loader may be mounted in any position. The carrier 32 has freedom of movement in the horizontal direction over two guide posts 33 and 34 the ends of which are fixed in the sides of the box 20. Ball bearing retainers 35 are press-fitted between the guide posts 33 and 34 and bushing inserts in the frame 32. When the frame 32 moves under the motion of the cam 29 the bearing retainers 35 move through half as long a distance. This type of bearing-bushing combination is old in the art and is not essential to our inventive concept. Any slide arrangement might be used with success.

The cam 30 similarly drives two roller followers 36A and 36B which are fixed in the vertical carrier frame 37 (in the other half of the box 20). Two guide shafts 38 and 39 are fixedly attached to the vertical carrier 37 and move with it. They each move on ball bushing retainers 40, through two bushings 41 which are fixed in the frame 20. At their upper ends the shafts 38 and 39 extend through the bushings 41 and the box 20. Another shaft 42 is supported by the carrier frame 37 at its lower end. This shaft moves vertically within a sleeve 43. Ball bearing bushings (not shown) which are interposed between the shaft 42 and the sleeve 43 to guide the shaft. A gear 44 is fixed on the shaft 42 just above the shafts's point of support on the carrier 37. A horizontally aligned gear rack 45 is fixed across the horizontal carrier frame 32. The gear 44 and the rack 45 are always engaged; when the rack 45 moves horizontally the gear 44 and its shaft 42 rotate.

Referring particularly to Figure 3, the upper ends of the shafts 38 and 39 narrow at the shoulders 46 and 47. These narrow ends are fixed in holes in a dished base disk 48 by screw caps 49 which attach to the threaded upper ends of the shafts. The disk base 48 carries an internal ring gear 50 around its upper edge. The shaft 42 has a flanged upper end 51 which is fixedly attached to a housing 52 that is positioned in a central hole in the disk 48. There exists a clearance between the housing 52 and the disk 48 so that the shaft 42 may rotate the housing 52 without causing the disk 48 to rotate. The housing 52 has an axially eccentric upper section 53 which performs two mechanical functions: first to fixedly carry a work supporting arm 54 which is integral with it; and second to rotatably support a second, somewhat shorter work arm 55. Both arms are of the narrow box construction. The shorter arm has a short vertical shaft 56 at its radially inner end. This shaft is rotatably supported within the eccentric portion 53 of the housing 52 by a ball bearing assembly 57 which has its inner race fitted around the shaft 56 and its outer race fixed within the hollow central section of the eccentric 53. A gear 59 is also carried by the short shaft 56 below the bearing 57. This gear 59 meshes with the internal ring gear 50 through a semi-circular, horizontal aperture in the side of the eccentric 53 wall. Thus the side wall 53 surrounds the gear 59 except along the line at which the gears 59 and 50 are in mesh. The upper edge of this aperture bears against the upper surface of the ring gear 50 as at point 60.

Both of the arms 54 and 55 have removable wall sections 61 which give access to the pneumatic spring return cylinders 62 which control the work-clamping mechanisms. The internal clamping mechanism of the arm 55 is not shown as it is substantially the same as that of the arm 54. The cylinder 62 is pivotally supported within the arm 54 by a trunnion mount 63. The rod 64 of the cylinder 62 connects to a crank arm 65 through a pivoting clevis joint 66. The arm 65 drives a shaft 67 which is rotatably supported in a projection 68 from the arm 54 and in a stationary clamp half 69. The clamp half 69 is raised above the height of the arm 54 to bring it into the same horizontal plane as the arm 55. At its upper end the shaft 67 carries another crank arm 70, which drives the movable clamp half 71 through a clevis connection 72. The movable half 71 swings about a pin 73 which is fixed in the stationary half 69.

The clamping mechanism of the arm 55 differs from that of the arm 54 in only two respects. First the clamps are coplanar with the arm and second the shaft which is equivalent to 67 is shorter since it does not have to make up for the difference in height between the arm and the clamps. The internal surfaces of the clamp halves are lined with vertical nylon inserts 74 which are in the clamps gripping action and serve to protect the finished surfaces of the workpiece being handled.

Clamp operation

The embodiment illustrated is adapted to transfer automotive pistons or similarly shaped articles but it is to be understood that the configuration of the clamps may be varied to handle objects of other shapes. A piston is shown as gripped by the clamp 74 of the left hand arm 55 of Figure 3, while the clamp 71 of the right hand arm 54 of Figure 3 is shown empty.

At the point in the operational cycle at which the clamps must close about the workpieces, a valve (not shown) opens the air lines which connect to the air cylinder 62 and its counterpart in the arm 55. These cylinders are of the spring return type and the opening of their air lines causes them to retract their rods 64. The rods 64 retract the crank arms 68 so as to rotate the shafts 67 and close the movable clamp halves 71 and 74. When the valve readmits air to the cylinders 62 the clamps open.

Loader operation

Assuming that the clutch 25 is constantly engaged and the brake 27 is constantly disengaged (as will be disclosed subsequently this is not the usual operational condition) the cams 29 and 30 will be rotated through the geared speed reducer 26. Also assume that the direction of rotation of these cams is clockwise as viewed in Figure 2 (it will be obvious from the following that a reversal in the direction of rotation of the cams will reverse the order of the cycle of operation). The cam 29 is shaped so that it will act through the roller followers 31 to cause the horizontal carrier frame 32 to move to the right during its first 90 degrees of rotation. During the second 90 degrees of rotation of the cam 29 the carrier will dwell at its extreme right position. During the third 90 degrees it will move to the left and during the last 90 degrees it will dwell at the left. When the carrier 32 moves the gear rack 45 causes the gear 44 to rotate. Again from the view of Figure 2 the motion of the carrier 32 to the right causes the gear 44 to rotate in a clockwise direction, while a motion of the carrier 32 to the left rotates the gear 44 in a counter-clockwise direction.

During the two 90 degree periods of cam rotation in which the carrier 32 is moving, the cam 30 is acting upon the followers 36A and 36B in such a manner as to cause the carrier 37 to dwell. And conversely while the carrier 32 is dwelling the carrier 37 is moving from one extreme position to the other. The carrier 37 moves downwardly while the carrier 32 is dwelling at the right and upwardly while the carrier 32 is dwelling at the left. The shafts 38 and 39 move with the carrier 32 and transmit its up and down motion to the head 48. Thus the actual output of the box 20 during such times as the motor 24 is operative, the clutch 25 is engaged, and the brake 27 is disengaged is as follows:

A. The shaft 42 rotates in a clockwise direction.
B. The shafts 38 and 39 retract into the box 20.
C. The shaft 42 rotates in a counter-clockwise direction.
D. The shafts 38 and 39 extend out of the box 20.

The effect of the axial translation of the shafts 38 and 39 is obviously to move the head 48 and the arms 54 and 55 in that direction. The effect of the rotation of the shaft 42 is somewhat more complex. Referring to Figure 3 the rotation of shaft 42 causes the housing 52 to rotate within the disk 48. The arm 54, being integral with the axially eccentric upper section 53 of the housing 52, rotates with it. Since the shaft 42 rotates through 180 degrees the arm 54 also rotates through 180 degrees. As the eccentric 53 rotates within the disk 48 it moves the rotatable gear 59 along the internal ring gear 50. The gear 59 contacts the ring gear 50 through the aperture in the wall 53. This action forces the gear 59 to rotate and swing the arm 55. The distance through which the carrier 32 moves, and the pitches of the gear rack 45 and the gear 44 are such that the shaft 42 rotates through 180 degrees each time the carrier 32 moves. Thus the arm 54 swings through 180 degrees each time the carrier 32 moves. The ratio of the gear 59 to the ring gear 50 is such that the arm 55 also swings through 180 degrees with each rotation of the shaft 42.

It is to be most particularly noted that the arms 54 and 55 swing so as to pass each other during each motion. Because arm 55 is shorter than arm 54 by a distance equal to the eccentricity of the housing 53 from the shaft 52 the clamps 71 and 74 miss each other in passing. And because the clamp 71 is elevated above the plane of the arm 54 the clamps operate between the same two end points. In essence the motion constitutes both arms reciprocating through conjugate 180 degree arcs about a center and the center reciprocating so as to favor the shorter arm.

As is shown in Figure 1, one point of the loader's operation may be the work holder of a production machine such as a lathe 77 and the other point may be a conveyor line 78. The conveyor is disposed so as to bring rough pistons from a previous station and to carry the finished pistons to a succeeding work station. It is externally controlled so as to move through a distance equal to the spacing between the workpieces after each cycle of loader operation. The physical relationship of the loader and the conveyor is such that when either of the arms 54 or 55 is in a fully elevated position its work clamp is in a gripping contact with a workpiece disposed on the conveyor. In such a situation, beginning with the arms in the position shown, the cycle of operation is as follows:

A. The clamps close about a finished piston at the lathe and a rough piston at the conveyor.
B. The arms extend outwardly from the loader, clearing the pistons from the lathe and conveyor.
C. The arms rotate so as to exchange positions.
D. The arms move inwardly, placing one piston in the lathe and the other in the conveyor.
E. The clamps open, dropping the pistons.
F. The arms withdraw outwardly.
G. The arms rotate so as to exchange positions.
H. The clutch 25 opens and the brake 27 engages, stopping the loader motion.
I. When the lathe's work cycle is completed the arms move inwardly and the cycle begins again.

This novel pattern of operation has several important advantages with respect to the prior art. First the production machine is serviced quickly. As soon as one arm has removed a finished piston another arm reloads it. Secondly the arms require only 180 degrees of clearance instead of the usual 360 degrees required by swinging arm loaders. Other advantages arise from the mechanical actuation and the simplicity of operation.

Having thus described our invention we claim:

1. In a work transfer mechanism: a base; a first arm pivotable in a first plane about a first axis which is fixed with respect to said base; a second arm pivotable in a second plane about a second axis which is movable with respect to said base, said second plane being parallel to said first plane; work holding means fixed to said arms; and means for moving said second axis in a circular orbit having said first axis as its center.

2. A loading and unloading mechanism for production machine including: a source of rotary power; a camshaft driven by said power source; a first arm pivotable in a first plane about an axis fixed with respect to said base; a second arm pivotable in a second plane about a second axis, said second plane being parallel to said first plane and said second axis being movable with respect to said base in a circular orbit having said first axis as its center; work carrying means fixed to said arms; means carried by said camshaft for pivoting said arms; and means for actuating said work carrying means.

3. A loading and unloading mechanism for production machines, comprising: a base; a source of rotary power; a camshaft driven by said power source; a first arm pivotable in a first plane about an axis which is fixed with respect to said base; a second arm pivotable in a second plane about a second axis which is movable with respect to said base in a circular orbit having said first axis as its center, said second plane being parallel to said first plane; work holding means carried by said first arm in said first plane; an appendage carried by said first arm and having one section in said second plane; work holding means carried by said appendage in said first plane; means carried by said camshaft for pivoting said arms, and moving said second axis.

4. A loading and unloading mechanism for production machine, comprising: a base; a source of rotary power; a first arm of a first length, pivotable in a first plane about an axis which is fixed with respect to said base; a second arm of a second length pivotable in a second plane about a second axis which is movable with respect to said base, said second plane being parallel to said first plane; work holding means carried by said second arm in said second plane; and means driven by said power source for pivoting said arms and translating said movable axis through a distance equal to the difference in length of said arms.

5. The structure of claim 4 is which said means driven by said power source for pivoting said arms and translating said movable axis comprise: a camshaft; a first slide movable in a first direction and a second slide movable in a second direction which is perpendicular to said first direction, said slides being alternately reciprocated by said camshaft; and gear means for converting the linear motion of said first slide into rotary motion.

6. In a work transfer mechanism in combination: a source of rotary power; a base; a camshaft; a first slide movable in a first direction and a second slide movable in a second direction which is perpendicular to said first direction, said slides being alternately reciprocated by said camshaft; a first arm pivotable in a first plane about a first axis which is fixed with respect to said base; a second arm pivotable in a second plane about a second axis which is movable with respect to said base, said second plane being parallel to said first plane; work holding means fixed to said arms; means for drivingly connecting said first slide to said arms in such a way as to reciprocate them in a direction perpendicular to the planes of their pivoting; and means for drivingly connecting said second slide to said arms in such a way as to cause them to pivot and to cause said second axis to rotate about said first axis.

7. A work transfer mechanism as defined in claim 6 in which said means for drivingly connecting said second slide to said arms in such a way as to cause them to pivot and to cause said second axis to pivot about said first axis comprises: a gear rack carried by said second slide; a shaft rotatably supported by said base; a gear drivingly connected to said shaft and in mesh with said gear rack; an eccentric housing carried by said shaft external to said base, said first arm being fixedly supported by said housing and said second arm being rotatably supported by said housing; a second gear fixedly attached to said second arm and a ring gear, supported against rotation and in mesh with said second gear, whereby said second gear is rotated at such time as said housing rotates.

8. In a work transfer mechanism for a production machine which has a work chuck, in combination: a source of rotary power; a base; a camshaft; a first slide movable in a first direction and a second slide movable in a second direction which is perpendicular to said first direction, said slides being alternately reciprocated by said camshaft; a first arm pivotable in a first plane about a first axis which is fixed with respect to said base; a second arm pivotable in a second plane about a second axis which is movable with respect to said base, said second plane being parallel to said first plane; work holding means fixed to said arms; means for drivingly connecting said first slide to said work holding means in such a way as to reciprocate them in a direction perpendicular to the planes of their pivoting; and means for drivingly connecting said second slide to said arms in such a way as to cause them to pivot and to cause said second axis to rotate about said first axis.

References Cited in the file of this patent
UNITED STATES PATENTS

| | | |
|---|---|---|
| 1,974,837 | Schillinger et al. | Sept. 25, 1934 |
| 1,975,051 | Peiler | Sept. 25, 1934 |
| 1,993,754 | Smith et al. | Mar. 12, 1935 |
| 2,554,699 | Gamble | May 29, 1951 |
| 2,570,660 | Gamble | Oct. 9, 1951 |
| 2,692,693 | Newburg | Oct. 26, 1954 |